Figures 1, 1A:
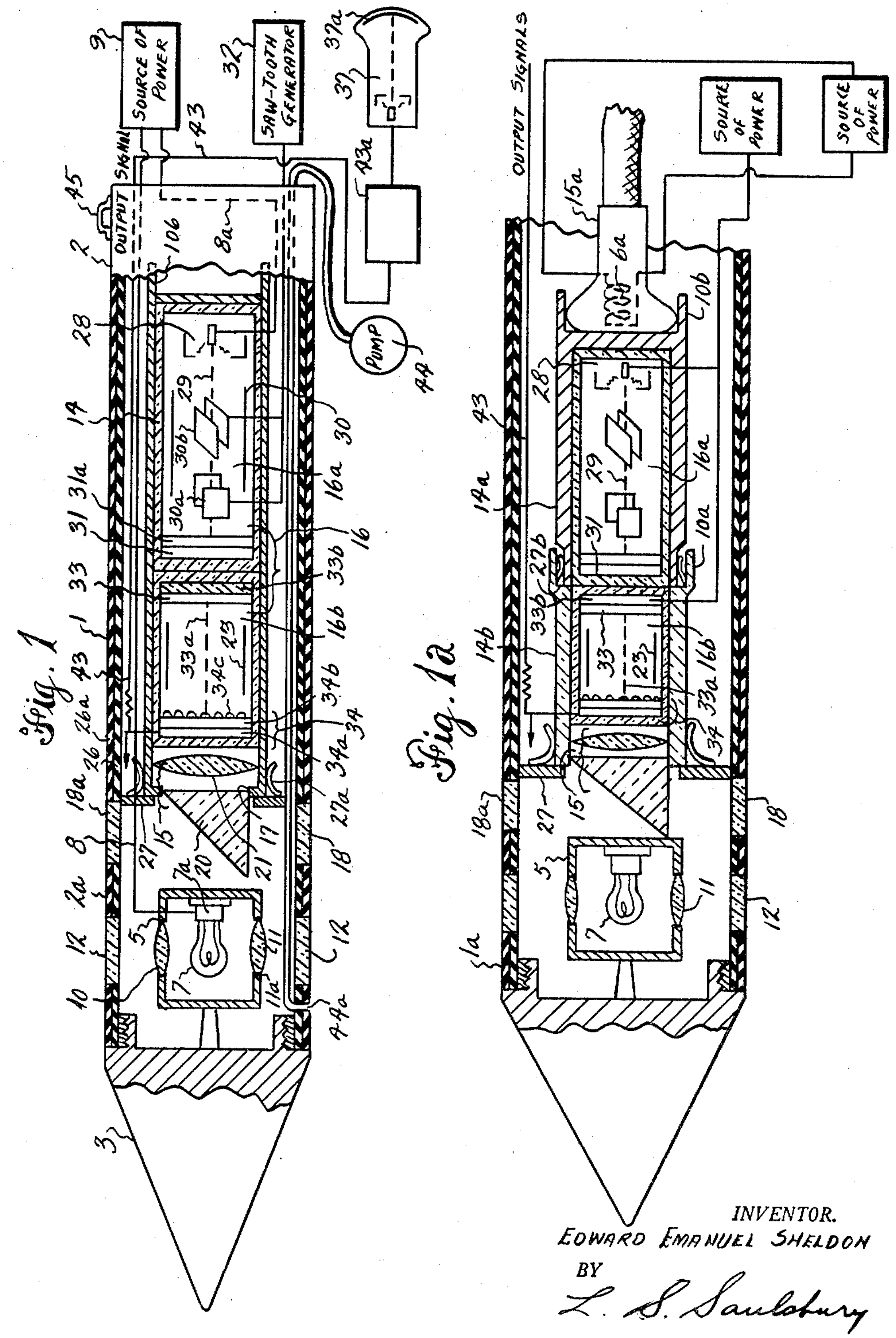

XR 2,877,368
1 A 3075E
CROSS REFERENCE
SEARCH ROOM
X2530

March 10, 1959 E. E. SHELDON 2,877,368

DEVICE FOR CONDUCTING IMAGES

Filed March 11, 1954 3 Sheets-Sheet 1

INVENTOR.
EDWARD EMANUEL SHELDON
BY
L. S. Saulsbury
ATTORNEY

2877368
OR IN 313/372

March 10, 1959 E. E. SHELDON 2,877,368

DEVICE FOR CONDUCTING IMAGES

Filed March 11, 1954 3 Sheets-Sheet 2

INVENTOR.
EDWARD EMANUEL SHELDON
BY
L. S. Saulsbury
ATTORNEY

March 10, 1959 E. E. SHELDON 2,877,368

DEVICE FOR CONDUCTING IMAGES

Filed March 11, 1954

3 Sheets-Sheet 3

INVENTOR.
EDWARD EMANUEL SHELDON
BY
L. S. Saulsbury
ATTORNEY

United States Patent Office 2,877,368

Patented Mar. 10, 1959

2,877,368

DEVICE FOR CONDUCTING IMAGES

Edward Emanuel Sheldon, New York, N. Y.

Application March 11, 1954, Serial No. 415,669

5 Claims. (Cl. 313—65)

This invention relates to a novel instrument for examination of the interior of the parts, channels or passages which are inaccessible to the examiner and has the common subject matter with my U. S. Patent No. 2,764,-149, issued in September 25, 1956, which was co-pending and had a common subject matter with my application Ser. No. 15,222, filed on March 16, 1948, and now abandoned. Due to the inability of light to bend around the corners, the present instruments used for such examinations have to be straight and rigid so that the eye of the examiner and the examined part are in one straight line. The instruments using optical lenses or prisms will not help in the situation when the shape and the size of the examined part is variable and unknown in advance. In such a case, the position of the curves and angulations in the examined parts or passages is unknown and therefore the lenses or prisms cannot be positioned to anticipate deviations of the axis of the examined channel from the straight line.

The purpose of this invention is to provide means for inspection of inaccessible channels, such as hollow parts of machinery or of other inaccessible tortuous passages. My device may be introduced inside of a part which cannot be inspected visually without dismantling or destroying the whole machine and will transmit the image of said part to the observer outside of said part. My invention will be especially useful for the examination of coils and pipes or other curved structures. My device can be also used as a probe to be inserted into a solid object and to transmit information about its internal structure.

Another objective of my invention is to intensify the image of the examined internal parts or passages so that the final image will be presented to the observer with the luminosity facilitating inspection of said image.

Another purpose of my invention is to enable simultaneous observation of said inaccessible parts by many examiners, situated in close or remote locations, which was not possible until now.

Another objective of this invention is to change, decrease or amplify the contrast of the image of the examined part.

The objectives of my invention are realized by a novel device which is flexible to allow its introduction into the examined part regardless of its curvatures or angulations and which after its introduction into the examined part will produce a light image of said part, will next convert said light image into video signals and will transmit said video signals outside of said part. Video signals are reconverted in receivers outside of the examined part into visible images for inspection or recording. My intrascopic device can produce black and white images, as well as multi-color images, showing faithfully or arbitrarily the colors of the examined part.

In particular this novel device makes use of a television pick-up tube consisting of two separate independent elements which can be introduced separately into the examined part and which after introduction work in cooperation as a television camera. As each of these two separate elements is smaller in size than any conventional television camera can be made, this novel television camera can be introduced into locations which, because of small size or tortuous shape of passages leading to them, were inaccessible to the most miniaturized television cameras known in the art.

Another marked improvement in my novel television camera is elimination of magnetic deflecting coils which are bulky and occupy so much space that even a small television tube using them cannot be introduced into narrow passages. The use of conventional electrostatic deflecting system results into a marked distortion of images especially in pick-up tubes using the slow scanning electron beam. These drawbacks are eliminated in my intrascope and therefore in spite of its very small size it is capable of producing images of a good definition and contrast.

In some applications even this novel intrascope utilizing a pick-up tube divided into two separate independent elements cannot be introduced into very narrow or tortuous passages. In such cases I use a novel image conductor in combination with my television pick-up tube. The novel image conductor consists of a flexible guide of material having a high index of refraction and critical angle of reflection which prevents the escape of the light from said guide. The novel image conductor may be made of any desired size or shape and therefore it can penetrate the most inaccessible locations and can transmit the image therefrom to the television pick-up tube or directly to the outside to the observer.

Figure 1B:
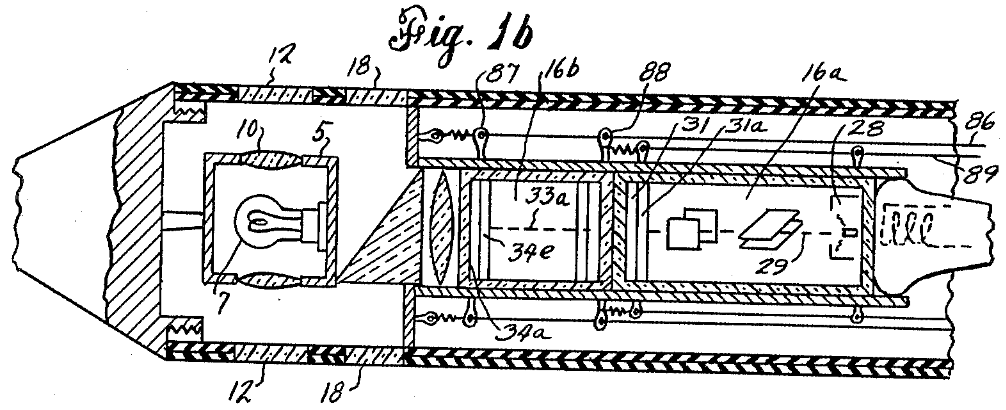
Figure 2:
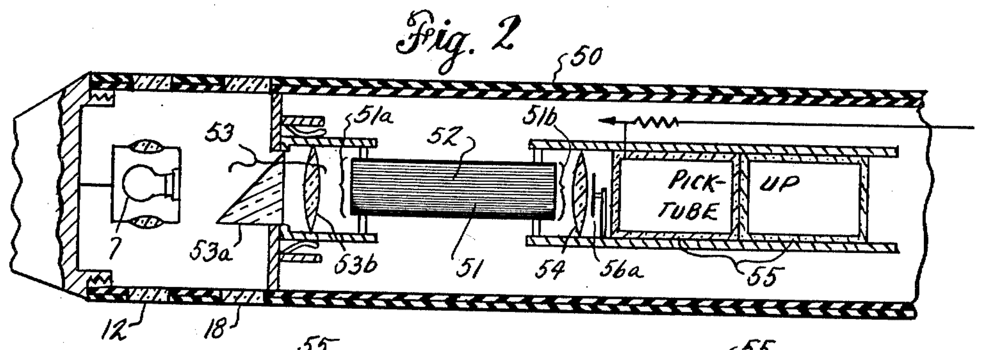
Figure 2A:
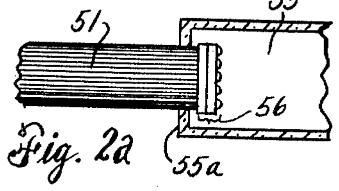
Figure 2B:
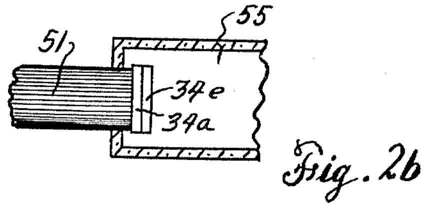
Figure 3:
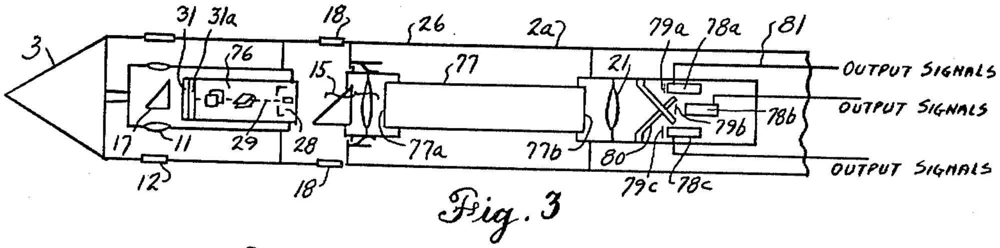
Figure 3A:
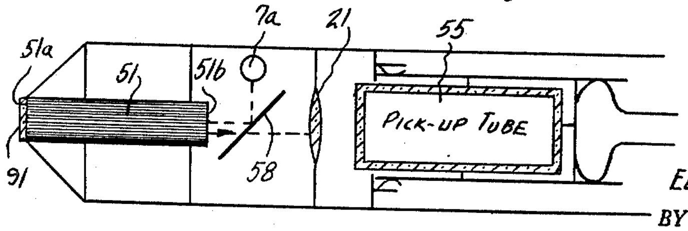
Figure 1D:
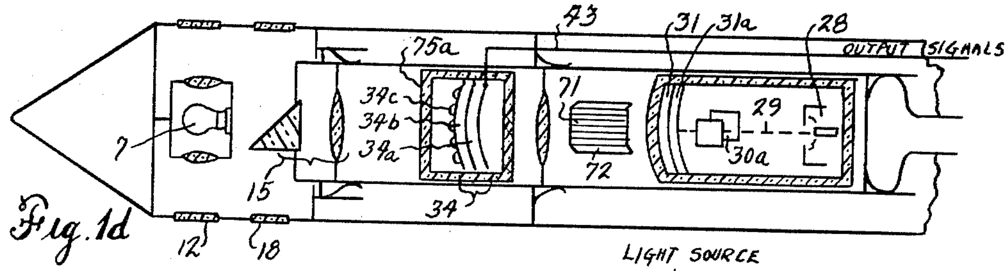
Figure 1C:
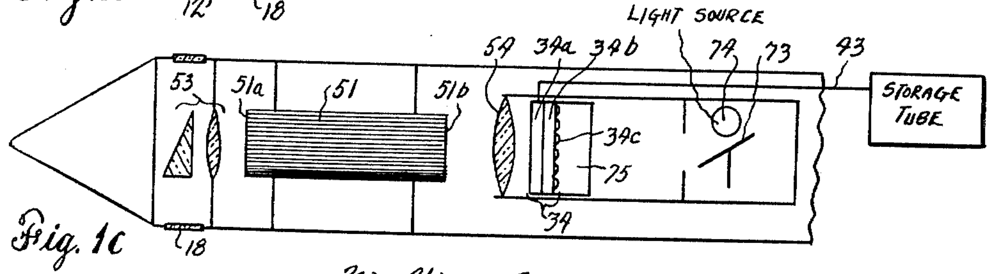
Figure 6:
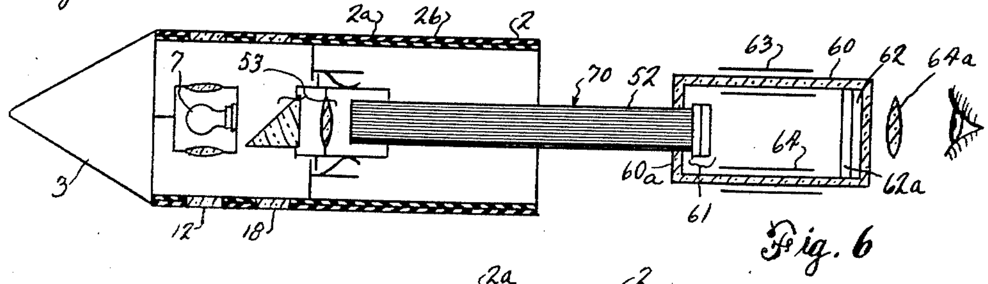
Figure 4:
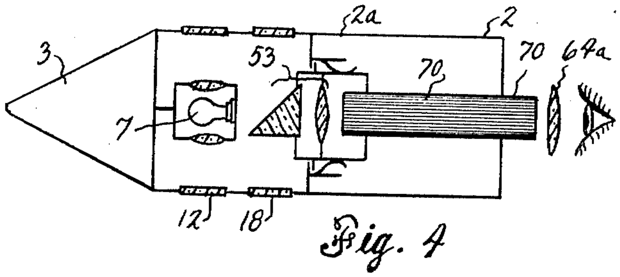
Figure 5:
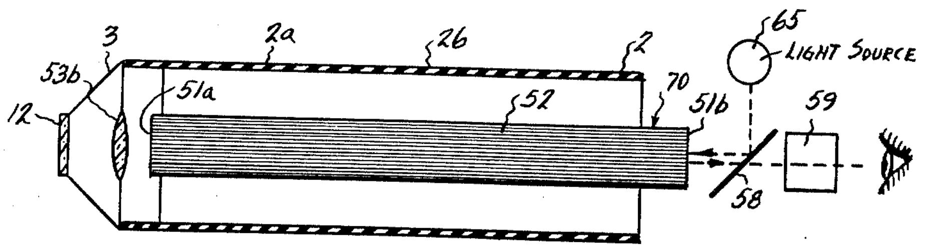

In the drawings:

Fig. 1 represents a partially sectioned view of the novel intrascope;

Figs. 1*a*, 1*b* and 1*c* show a modification of the intrascope;

Fig. 1*d* shows an intrascope with a simplified television camera tube;

Fig. 2 shows a combination of light image conductor with a television pick-up tube;

Fig. 2*a* and 2*b* represent a modification of the combination comprising an image conductor and a pick-up tube;

Fig. 3 represents a modified embodiment of my intrascope provided with image conductor;

Fig. 3*a* represents a modification of my intrascope in which image conductor is in contact with the distal end of the intrascope;

Figs. 4 and 5 represent a simplified intrascope provided with a light image conductor; and Fig. 6 represents an embodiment of my intrascope provided with an image amplifying tube.

The new device which may be called the intrascope 1 is shown in Fig. 1. The handle 2 is a hollow tube of diameter corresponding to the examined part. The handle may be rigid or semi-flexible or completely flexible according to the part to be examined. At the end of the handle begins the flexible part **2*a* of the intrascope which also has width and length suitable for the size of the examined part. In case the intrascope is used for examination of fragile parts, the part 2*a* must be very flexible and pliable in order to avoid damage to the wall of the examined part. The basic feature of the material for the flexible part of the intrascope is therefore that it must be easily bent and molded by the walls of the passages in which it is being introduced. Such material may be a suitable plastic, or rubber 26 of the type used by Davol Rubber Company of Providence, Rhode Island, for their gastric tubes. In case the intrascope is used for investigation of sturdy parts or of machinery the part 2*a* may be obviously more rigid. The flexible part 2*a* of the intrascope may be in such a case made of the stainless steel spiral sheet designed not only for durability but also to maintain the proper degree of flexibility and elasticity. The metal spiral is tapered to insure its uniform bending. The intrascope may be covered with an outer tubing 26a such as of neoprene. This prevents dust particles and moisture from affecting the optical and pick-up system located inside of the intrascope. At the end of the flexible part there is a semi-flexible tip 3 which may be screwed on the flexible part and can be easily removed giving thereby access to the inner structures of the intrascope. The tip consists of a rubber conical finger and serves to facilitate the gliding of the intrascope within the examined part. In order to facilitate the introduction of the intrascope into parts which have no curves my device can be made semi-rigid by inserting into it a semi-rigid stilet. In case the intrascope is used as a probe for insertion into a solid object the tip 3** should be preferably rigid and sharply pointed to be able to pierce the examined object.

In some cases the examined part has to be distended by air or fluid insufflation prior to the examination. A special air pump attachment 44 and a channel 44a in the intrascope is provided for this purpose. The channel 44a also may serve to evacuate contents of the examined part before examination to improve visibility. The knob 45 on the proximal end of the intrascope serves to indicate to the examiner the position of windows 12 and 18 of the intrascope. In some cases the layer 26 should be of a dielectric material to prevent any short-circuits.

In the distal end of the flexible part of the intrascope there is a housing box 5 containing the illumination system 7. The box 5 may also be attached to the inner walls of the intrascope by means of the brackets or may be held by springs. It is obvious that there are many means for attachment of the box 5 which are well known in the art. All walls of the housing box 5 except the one facing the television pick-up tube 16 are provided with windows 10 for transmission of the light from the illuminating system 7. These windows are correlated with the windows 12 in the flexible part of the intrascope which transmit the light from the illuminating system to the examined part. In some cases the windows 12 may be made to extend over the circumference of the intrascope. In some cases the window to transmit illumination from the light source to the examined part may also be provided in the distal end of the intrascope instead of being in its side walls, and in such case the tip may be made of transparent material or may be omitted. Windows 12 may be provided with shutters which can be controlled from the proximal end of the intrascope which is outside of the examined part.

The illuminating system may consist of the electrical bulb 7. The electrical bulb may be mounted in the housing box 5 by means of a socket 7a. In some cases it is advantageous to use the objective lens 11 between the light bulb and window 12 in order to concentrate the light on one field. The lens may be held in position by brackets 11a. The light bulb is activated by the source of electrical power 9 situated outside of the examined part. Such a source may be the commercial electrical current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. The housing unit 5 may be in some cases omitted and the light source may be attached to the socket 7a which is held by brackets.

In the flexible part 2a proximally to the housing box 5, there is a rigid non-transparent housing compartment 14 containing the optical system 15 and the novel television pick-up tube 16a and 16b. The housing 14 has an opening 17 in which the optical system 15 is lodged and which serves to admit the image of the examined part. This opening is correlated with windows 18 in the flexible part of the intrascope which transmit the image of the examined part. In some cases the windows 18 may be made to extend over all the circumference of the intrascope. The windows 18 may be provided with shutters operated from the proximal end of the intrascope which is externally to the examined part. The housing 14 containing the television pick-up tube 16a and 16b and the optical system may be attached to the inner wall of the flexible part 2a of the intrascope by means of brackets or may be held by springs 27a. As the housing box fits into the encasing holding member 26 and is held by it tightly, in some cases no additional supporting means such as springs are necessary.

The optical system 15 may consist of 90° gable prism 20 and of lens 21. The optical system may have its own housing unit instead of being lodged in the compartment 14 and may be then introduced into the intrascope separately.

In some cases it is desirable to have a large field of vision and at the same time to preserve the necessary magnification of the examined part. In case the magnification of the examined part is not necessary a large field of vision can be obtained by using the lens providing 80° field of vision instead of the usual 45–50°. The image produced by the optical system is inverted but it can be reverted to the original position either by an additional lens or electron-optically in the viewing tube. The rotating mirror may also serve to admit image either through window 18 or 18a without rotating the whole camera 16.

The housing box 14 contains the novel miniature television camera 16 which was designed to reduce to the minimum the size of the television camera. The television pick-up tubes known previously in the art could be miniaturized only to a certain degree, which was not sufficient in certain applications as some of the examined parts are too small to allow the introduction even of the smallest conventional pick-up tube. This is true especially for the type of tubes having external deflecting coils such as of magnetic or electro-magnetic type, and in such situations, my novel camera 16 will be very suitable as it does not require any external deflecting or focusing coils at all. The camera 16 consists of two vacuum tubes 16a and 16b. The tube 16a has an electron gun 28 which produces an electron beam 29. The electron beam 29 is focused by electrostatic field 30. The electron-optical system for focusing the electron beam 29 may be simplified and markedly reduced in length by using the unipotential electrostatic lens instead of the usual two-lens system. The electron beam 29 is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. One deflecting field is produced by the horizontal deflection plates 30a and may have line frequency such as 5–15,000 cycles per second. Another deflecting field is provided by the vertical deflection plates 30b and may have field frequency such as 15–60 cycles per second. In this way the electron beam 29 is made to scan the fluorescent screen 31 in a regular television raster. The deflection system may be further simplified and miniaturized by having only horizontal deflection plates 30a. The vertical deflections 30b are eliminated and the vertical deflection of the fluorescent light spot is provided by the rotating drum 71 with plural mirrors 72 as shown in Fig. 1*d*. The fluorescent screen 31 may be provided with electron transparent metallic conducting backing layer 31a such as of aluminum. The fluorescent screen 31 must be of a phosphor of a very short persistence in order to obtain a good resolution of the image. ZnO has decay time of 1 microsecond and is suitable for this purpose. Still better results may be obtained by means of ZnS phosphor and using only ultra-violet component of its fluorescent emission which has decay time of 1/10 microsecond. In some cases, it is preferable to make the fluorescent screen 31 of semi-spherical curved shape as it will improve definition of the flying light spot. The fluorescent layer 31 may also be deposited on the supporting mesh screen instead of being deposited on the wall of the vacuum tube. This will improve definition of the flying light spot.

The vacuum tube **16*a* operates in combination with the vacuum tube 16*b* forming together the novel television camera 16. The vacuum tube 16*b* has a photoemissive electrode 33 which may be deposited or attached to one of the walls of said vacuum tube. In some cases it is preferable to provide a light transparent conducting layer 33*b* such as of material known in the trade as "Nesa," or of compounds of tin or cadmium, on the side of said photoemissive electrode 33 facing the fluorescent screen 31. The photoemissive electrode 33 may be of CsOAg of caesium, lithium or rubidium on antimony, arsenic or bismuth. At the opposite end of the vacuum tube 16*b* there is provided photocathode 34 which consists of a light transparent signal plate 34*a*, a light transparent insulating layer 34*b* and of a photoemissive mosaic 34*c*. The signal plate 34*a* may be a thin transparent layer of metal or other conducting material. The insulating layer 34*b* may be of mica, silica, or other transparent dielectric material and photoemissive mosaic 34*c* may be of CsOAg or of caesium, rubidium or lithium on antimony, arsenic or bismuth. In some cases the photoemissive layer 34*c* may be, instead of a mosaic, also of continuous type. In cases in which electrostatic focusing field 23 is used to focus the scanning electron beam 33*a* on the mosaic 34*c***, much better resolution will be obtained by making such mosaic of a curved semi-spherical shape. In addition, the use of such spherically shaped photocathode will eliminate instability of the image which is very marked when using electrostatic fields for focusing a slow electron beam.

The light image of the examined part is projected by the optical system on the photocathode 34 of the vacuum tube **16*b*. The light image produces emission of photoelectrons from the layer 34*c*. As a result a positive charge image having the pattern of said light image is left on the photoemissive mosaic 34*c*. Both vacuum tubes 16*a* and 16*b* are held in apposition to each other and in such a manner that the fluorescent screen 31 of the vacuum tube 16*a* is adjacent to the photoemissive electrode 33 of the tube 16*b*. The scanning electron beam 29 impinging on the fluorescent screen 31 produces a light spot at each point of its impingement. The scanning illumination excites the photoemissive electrode 33 and produces thereby a fine scanning beam of photoelectrons 33*a*. The photoelectron beam 33*a* is of the scanning type because it is produced by the scanning electron beam 29. The photoelectron beam 33*a* may be further focused by electrostatic fields 23. In some cases the photoemissive electrode 33 and the mosaic 34 are disposed so close to each other that the focusing fields may be eliminated which will further reduce the size of the vacuum tube 16*b*. When the focusing fields are omitted I found that separation of electrode 33 and mosaic 34** should not exceed 0.25 millimeter.

In a vacuum tube **16*b*** instead of the photoemissive mosaic I may also use a photoconductive photocathode such as shown below in Fig. 2*b*. The photoconductive photocathode comprises a conducting signal plate **34*a* which is connected to the circuit producing video signals and a photoconductive layer 34*e*** deposited thereon as shown in Fig. 2*b*. The photoconductive layer may be of selenium, zinc selenide or of antimony sulfide or of other photoconducting materials.

Another important modification of the vacuum tube **16*b* was accomplished by eliminating the photoemissive electrode 33. In this embodiment of invention as shown in tube 75** in Fig. 1*c*, the fluorescent light scans directly the photoemissive mosaic **34*c*. The emission of photoelectrons from the photoemissive mosaic 34*c* produces signals in the capacitatively coupled signal plate 34*a***. These signals are converted into video signals in the manner well known in the art.

In examination of stationary objects my intrascope may be further simplified by using as a source of scanning light instead of a vacuum tube **16*a*, a steady source of light such as an electrical bulb 74 in combination with an oscillating mirror 73** or rotating drum as shown in Fig. 1*c*. The oscillating mirror or drum is limited in frequency of oscillations; therefore video signals produced by this device must be stored until the whole image is assembled. It is also possible to use instead of a storage tube for video signals, a receiver tube such as a kinescope having a "memory screen" such as "dark trace" screen. Also a facsimile receiver can be used for this purpose. The pick-up tube 75 may be also simplified by eliminating the electrode 33 as was explained above. The oscillating mirror may be mounted on a pivot and may be energized by solenoids through which the current of high frequency is flowing. One set of coils serve to move the mirror in horizontal axis. Another set of coils is vibrating the mirror on vertical axis. The action of both coils makes the mirror oscillate in such a manner that the light reflected by said mirror will scan the area on which it is projected in the same manner as the flying spot which is produced by a cathode-ray tube. The construction of an oscillating mirror is well known in the art and it is believed therefore that its further detailed description will only serve to complicate the drawings.

The electron beam **33*a* may be of high velocity such as used in the iconoscope type of television pick-up tubes or may be of a slow velocity. In this embodiment of my invention, I use the slow scanning electron beam. It is to be understood however that the fast scanning electron beam may be used in my invention as well. The electron beam 33*a* scanning across the charge image stored in the mosaic 34*c* converts said image into electrical signals which appear at the signal plate 34*a*. These electrical signals can be converted into video signals over the resistance in the manner well known in the art. The video signals are transmitted by the flexible coaxial cable 43 from the intrascope within the examined part to the video amplifiers 43*a* outside of said part. The amplified signals are transmitted from the amplifiers to the viewing tube of kinescope type 37 and are reconstructed therein into the visible image representing the image of the examined part. The viewing tube may be of kinescope type and does not have to be described in detail as it is well known in the art. The examined part will appear on the fluorescent screen 37*a* of the viewing tube where it can be inspected by many examiners. Transmission of the image from the amplifier 43*a* to the viewing tube can be done by coaxial cable 43 or by high frequency waves. The image can be sent therefore not only to the immediate, but also to the remote receivers or may be transmitted to multiple independent viewing tubes for the benefit of many examiners which was one of the objectives of this invention. The image on the viewing tube 37** may also be photographed simultaneously with the intrascopic examination in order to make a permanent record which was another purpose of this invention.

The contrast of the reproduced image may be changed, diminished or increased according to the needs of particular examination by using amplifiers provided with variable mu tubes, or by the use of kinescope in which gamma can be controlled. The signal to noise ratio of this system and therefore the definition of the reproduced image may be improved by using in amplifiers discriminating circuits which reject signals below the predetermined amplitude and eliminate therefore most of the noise signals. The coaxial cable 43 within the examined part may be encased in the above described means 26 or 26*a* for inserting the intrascope or may be attached to them.

The voltages for the operation of the tubes 16*a* and 16*b* are supplied through the flexible elastical wires 8*a* from the source of the electrical power 9 outside of the examined part. In the same way the horizontal and vertical synchronizing circuits, focusing fields and deflecting circuits are supplied with electrical energy from the outside source of power 9. The synchronizing and deflecting circuits and focusing fields are not described in detail as they are well known in the art and it is believed they would only complicate the drawings. In some cases the coaxial cable 43 may be outside of said inserting means 26 or 26*a*.

The housing 14 containing the television camera can be rotated in its position in the intrascope, so that the optical system 15 can be made to face the window 18 or 18*a* and to "see" thereby various areas of the circumference of the examined part. The rotation of the camera can be accomplished by means of a pusher 15*a* which fits into extensions 10*b* of the box 14. The rotation of the camera may be preferable in some cases to the rotation of the whole intrascope which allows to accomplish the same purpose.

The main rigid portion of the flexible intrascope is the television camera 16. Therefore the shorter the television camera is, the easier it will be for the intrascope to pass through sharply angulated or curved passages. One of the advantages of the novel pick-up tube 16 is that it makes it possible to break up the smallest pick-up tube into two component parts such as tubes 16*a* and 16*b* and introduce each of said tubes into the examined part separately, reducing thereby considerably the rigid portion of the intrascope which is due to the television camera, as shown in Fig. 1*a*.

To accomplish these objectives the flexible intrascope 1*a* shown in Fig. 1*a*, is introduced first into the examined part while containing only the box 5 housing the light source 7. Inside of the intrascope 1*a*, proximally to the box 5 there is a ring-like partition which serves as a stop 27 for the pick-up tube 16*b* which is to be introduced later. It is obvious that the shape of this stop may vary. The rest of the intrascope 1*a* is empty. The intrascope 1*a* is introduced first into the examined part. As the only rigid part of the intrascope is now the box 5 which is very small, this intrascope can easily pass even through very narrow and curved passages. After the intrascope 1*a* has been introduced into the examined part for a desired distance which can be read easily on the markings provided on the outside wall of the intrascope, the next step beings. Now the housing box 14*b* in which the vacuum pick-up tube 16*b* is mounted is introduced into the intrascope. The housing box 14*b* is pushed into the intrascope until it reaches the stop 27, which can be also ascertained by the X-ray control. The box 14*b* may be held against the stop 27 by spring extensions 27*a*, as shown in Fig. 1, on said stop 27. The housing box 14*b* may be pushed into its position by a flexible elastic guide 15*a* which is fitted into the proximal end of the housing box 14*b*. For this purpose the housing box 14*b* is provided with a ring-like extension 10*a* at its base which has spring-like properties. The head of the flexible pusher 15*a* fits into this extension and is kept in position by it. The flexible pusher 15*a* may also be provided with electrical coils 6*a* at its distal end which is adjacent to the element to be introduced into the intrascope. The coils 6*a* are connected to the source of electrical power situated outside of the examined part. In this way, the head of the pusher may be given electromagnetic properties by closing the circuit, energizing said coils 6*a*. The pusher 15*a* will be held therefore in the elements to be introduced into the intrascope, such as boxes 14*a*, 14*b* or the optical system 15, not only by the mechanical pressure of the extensions 10*a* or 10*b*, but by magnetic attraction as well. When the pusher 15*a* is to be withdrawn, the current supplying the coils 6*a* is shut off. To facilitate the guiding of the box 14*b* into the intrascope, a set of threads 86, as shown in Fig. 1*b*, may be used which are at one end attached to the stop 27, and which are threaded through the perforations in the extensions 87 of the housing box 14*b*. After the box 14*b* has been introduced into its proper position in the intrascope, the pusher 15*a* is removed. Another set of threads 89 is attached to the extensions 88 in the housing unit 14*b* and serves to pull out said box 14*b* to the exterior of the examined part when the examination is finished.

The housing box may be omitted in some cases and the tube 16*b* may be introduced into the intrascope without any housing and will be held in position by the same means as described above for holding the box 14*b*.

After the box 14*b* with the tube 16*b* has been introduced, the box 14*a* housing the tube 16*a* is introduced now into the intrascope in a similar manner as was described above. Both boxes 14*b* and 14*a* have openings at their proximal and distal ends respectively, which makes it possible to bring the fluorescent screen 31 of the tube 16*a* in close apposition to the photoemissive electrode 33 in the tube 16*b*. The boxes 14*a* and 14*b* are provided with mechanical means for securing a good contact of the proximal end of the tube 16*b* with the distal end of the tube 16*a*. One way of providing such a contact is to make the compartment 14*a* fit inside of the spring-like flange 27*a* at the proximal end of the compartment 14*b*. The housing box 14*a* contains vacuum tube 16*a* which has been described above. The housing box 14*a* is provided with spring-like extensions 10*b* which serve to accommodate the head of the pushing guide 15*a*.

The housing box 14*a* is pushed into the intrascope until it reaches the position of the stop 27*b*. This can be also checked by the X-ray control. The stop 27*b* is so situated that when the housing box 14*a* reaches it the tubes 16*b* and 16*a* will be in apposition to each other. In some cases flexible coils which can be converted into magnets by passing through them an alternating current from an outside source of electrical power may be provided on the stops 27 and 27*b* or at extensions 10*a* or 10*b* of the intrascope to help the positioning of boxes 14*a* and 14*b*. In this way the rigid portion of the intrascope which has to pass through a narrow passage or acute curvature is now only a fraction of the rigid part of intrascopes which use even the smallest pick-up tube of conventional type. This represents an important improvement as it makes it possible to introduce the intrascope into parts which were not accessible previously to examination.

It should be understood that all my intrascopes can serve for producing and transmitting color images as well. The color system may be of mechanical type such as using a color wheel, or may be of electronic type, such as using an optical system to split the light image into its component colors and to project them on television pick-up system.

In some applications even my novel intrascopic device cannot be introduced through the narrow or angulated passages. For such cases I designed a novel apparatus which will overcome even 180 to 360° bends in passages. Fig. 2 shows this embodiment of my invention. The intrascope 50 is provided with a novel image conductor 51. The image conductor 51 consists of multiple fibers of material having a high refractive index such as quartz, rutile or special plastics. In many applications the image conductor must be flexible and easily malleable. In such cases acrylic plastics such as Lucite or polystyrenes may be used. Especially Lucite is suitable for this purpose because it causes smaller losses of conducted light than other materials. Lucite and other above mentioned materials characterized by a high refractive index have the property of internal reflection of the light conducted by them. Such materials cannot conduct a whole image as such but they can conduct well a light signal, it means an image point. The size of the image point I found is determined by the diameter of a single conducting fiber 52. In my image conductor I assembled a bundle of such fibers which form a mosaic-like end-faces and which therefore can conduct plurality of image points. All these image points will reproduce at the other end-face of the image conductor the original image provided that the image conducting fibers remain in their original spatial relationship. Each fiber 52 should have, as was explained above, a diameter corresponding to the size of one image point. The diameter of 0.1 millimeter is well suitable for the purposes of my invention. In order to conduct an image of an area, e. g., of one square centimeter we must have many fibers 52, the number of fibers being dependent on the resolution of reproduced image that we desire. If the resolution of the conducted image should be 4 lines per millimeter, and if the image is of one square centimeter in size, we will need 40 fibers of 0.25 millimeter in diameter. As in many examinations it is not practical to be limited to the field of 1 $cm.^2$, I preferably use a few hundred of such fibers combined in one image conductor, which will allow to transmit an image of a large area.

The light conducting fibers should be polished on their external surface very exactly. They may be also preferably coated with a very thin light opaque layer which should have a lower index of refraction than the light conducting fiber itself. Such coating may have a thickness of only a few microns. I found a great improvement of flexibility of the light conductor 51 can be obtained by having the light conducting fibers 52 glued together only at their end-faces 51*a* and 51*b*. This is a very important feature of my device because the main requirement from the light conductor 51 is its flexibility and malleability. If the fibers 52 are glued together along their entire length the flexibility and malleability is so much reduced that it may be not possible to use it in many examinations in which the walls or passages are fragile and may be damaged by a rigid instrument. I found unexpectedly that having the conducting fibers 52 free along their path between the end-faces will not cause any deterioration of the conducted image. I found that in spite of the fact that fibers between their end surfaces were freely movable there was no blurring of the conducted image. It must be understood, however, that the fibers 52 at both end-faces of the conductor 51 must rigidly maintain their spatial relationship. Another important feature of this construction is that the diameter of the light conductor 51 can be now increased because no space consuming binder or glue is present between the fibers 52 except at their end-faces. Instead of using the binder at the end-faces of fibers 52, they may also be held together at their end-faces by a fine mesh screen. Each fiber is threaded through one opening of said mesh screen and is being held by said screen in constant position.

It may be added that smaller losses of light may be obtained if the fibers 52 are hollow inside instead of being solid. An improvement in contrast of conducted images can be obtained by coating light conducting fibers 52 with an opaque material which eliminates the leakage of light from one fiber to the adjacent one.

The number of fibers that can be used in many examinations will be limited by the diameter of the passages through which my intrascope has to pass. As in many situations the channel may be only 1–2 cm. wide it will be impossible to use a great number of fibers. I succeeded to overcome this limitation, by using in combination the light conductor 51 with a demagnifying optical system 53. By the use of the demagnifying optical system I can reduce the examined field to the diameter of the image conductor 51. If the optical system will demagnify the image five times, I can examine the field having 25 $cm.^2$ with the image conductor having the diameter of only 1 $cm.^2$. This combination represents a very important feature of my invention as it is not always practical or feasible to limit the examined field only to the diameter of the image conductor. Another important feature of my optical system 53 is that it allows to project the image on the end-face 51*a* of the light image conductor from which it can be transmitted to the other end of the conductor. If the image were projected on the side of the conductor 51 instead of on its end-face, it would not be conducted at all. This is accomplished by means of the gable prism 53*a*.

The light image conductor 51 may be introduced into examined part simultaneously with the intrascope. In some cases it is preferable to introduce my intrascope first and then insert the image conductor 51 or 70 into intrascope. In some cases the gable prism 53*a* or the whole optical system 53 may be attached to the end-face 51*a* of the image conductor to make one unit. The novel intrascope 50 may have the same construction of other parts as was explained above and illustrated in Figs. 1, 1*a* and 1*b*.

Fig. 2 shows the novel intrascope which comprises my novel image conductive system. The end-face 51*a* serves to receive the image. As was explained above the image is projected on the end-face 51*a* by the optical system 53 and is at the same time demagnified to reduce the size of the image to the size of the cross-section of the image conductor 51. The image is conducted by the multiple flexible fibers 52 which form the image conductor to the end-face 51*b*. The image emerging from the end-face 51*b* is projected by the optical system 54 on the television pick-up tube 55. If necessary the optical system 54 may be of magnifying type to enlarge previously demagnified image of the examined part. The television pick-up tube 55 may be of the novel type described and illustrated in Figs. 1, 1*a* and 1*b*. It should be understood, however, that all types of television pick-up tubes can be used in my intrascope in combination with image conductor 51. The television pick-up tube may be of conventional vacuum tube type. The television pick-up tube may be of photo-emissive type, photoconductive type, or photovoltaic type. The television pick-up tube may be of velocity modulation type. The television pick-up tube may use fast or slow scanning electron beam. The novelty of the combination of my image conductor with my television pick-up system resides in the ability of the intrascope provided with this combination to penetrate into locations which were inaccessible to my television pick-up system and to transmit said image from said inaccessible locations to the television pick-up tube. The television pick-up tube can then transmit the image to the outside of the examined part by means of coaxial cables and it can do it regardless of the distance between the television tube and the outside. The image conductor on the other hand is limited in its ability to conduct an image to the length of about 15 cm. because of prohibitive losses of light. Therefore, the combination of the image conductor with a television tube represents an important improvement in the art of the examining recesses inaccessible to direct visualization or to conventional optical systems. It should be understood that my system will be also capable of producing color images. For this purpose the revolving color wheel 56*a* may be provided in front of the television camera 55. Instead of the color wheel an optical system may be provided which splits the image into two or three color images and projects said images on different parts of the photocathode. It should be understood therefore that my invention may use all types of television pick-up tubes which can produce color images.

I found that the image conductor 51 causes severe losses of light. This loss of light is dependent of the length of the image conductor, on the number of bends and angle of said bends to which image conductor is subject in its passage to the examined part. I found that losses of light become prohibitive when the length of the conductor is about 15 cm. In some examinations the television pick-up tube cannot be activated with the amount of light available after the passage through the image conductor, because the optical system 54 disposed between the image conductor and the television pick-up tube causes an additional loss of 95% of useful light. In such cases I am using the embodiment of my invention shown in Fig. 2*a* or 2*b*. In this modification of my invention the image conductor extends through the wall **55*a* of the pick-up tube 55 inside of the tube. The photoelectric photocathode 56 is now deposited on the end-face 51*b* of the image conductor. The photocathode 56** may be of the photoemissive type as shown in Fig. 2*a* or photoconductive type as shown in Fig. 2*b*. In this construction the loss of light caused by the optical system 54 is completely eliminated which represents a thirty-fold increase in light available for the television pick-up tube and which makes the television pick-up tube now responsive to the image. The image conductor is cemented to the end wall **55*a* of the tube 55 by the vacuum type seal. In some cases it may be preferable to provide a support for the light image conductor near the face 55*a* of the television tube to reduce the pull of the image conductor 51** against the wall of the pick-up tube.

Another modification of my intrascope is shown in Fig. 3*a*. In this embodiment of invention the image conductor 51 has its end-face **51*a* adjacent to the distal end of the intrascope. The window 91 can be opened by mechanical means which are well known in the art and the end-face 51*a* of the image conductor 51 may be brought slightly forward. This will result in apposition of the image conductor with the examined part. In this embodiment of the invention the light source for illumination of the examined part may be provided at the proximal end 51*b* of the image conductor. The light source 7*a* projects the light onto mirror which has the property for partly reflecting and partly transmitting the light. Such mirrors are well known in the art and it is believed therefore that their detailed description is not necessary. The light reflected by the mirror 58 is conducted by the image conductor 51 to the examined part and forms an image thereof. This light is reflected next by the examined part and returns again through the image conductor 51 to the outside. As the mirror 58 is half-reflecting and half-tansparent the image of the examined part can pass through the mirror 58** and be focused by the optical system on the photocathode of the television pick-up tube.

Another preferred embodiment of my invention is shown in Fig. 3. The intrascope in this modification consists of a rigid part 2, flexible part **2*a* and semi-flexible tip 3. The mechanical construction of these parts is the same as described above and does not have to be repeated. The internal image producing and transmitting structures of the flexible part 2*a* are completely different. In particular the illuminating system 7 is replaced in this modification by the flying spot kinescope. The miniature fiying spot kinescope 16*a* or 76 was shown in Fig. 1 and is a vacuum tube provided with an electron gun 28 producing a fine beam of electrons 29, with circuits 30*a* and 30*b* for deflecting said electron beam in two mutually perpendicular directions and also having a screen 31 coated with a fluorescent material. The electron gun consists of an electron emission source and an electron-optical system to focus the electrons into a fine beam. The fluorescent screen of the kinescope must be of a phosphor of a very short persistence in order to obtain a good resolution of image. ZnO phosphor has decay time of one microsecond and is suitable therefore for this purpose. Still better results will be obtained by applying ZnS phosphor and utilizing only the ultra-violet component of its fluorescent emission, which has the decay time of 1/10 microsecond. The electron beam of the kinescope has to scan the fluorescent screen in a predetermined pattern. This scanning motion of the electron beam is obtained by the electrostatic or magnetic fields 30*a* or 30*b*, which produce deflection of said beam. This scanning electron beam 28 produces a scanning light spot which illuminates the examined part through window 12 and produces successive image points of said examined part. Successive image points are admitted through window 18 into intrascope and are projected by the optical system 15 on the end face of the image conductor 77. The image conductor 77 in this modification of my invention consists of a single rod of material, which is flexible and has a high index of refraction, such as Lucite, acrylic plastics, poly-styrenes or other materials. As was explained above, such materials cannot conduct an image. They can conduct a light signal only. In my novel device, the image is produced by a rapid succession of single image points. Each image point can be conducted by the conductor 77, because it represents only one signal. Each conducted image point, after it emerges from the conductor 77, is projected on a single or plural photo-tubes or photocells and is converted thereby into an electrical signal. If "black and white" image is sufficient, only one photo-tube 78 has to be used. The photo-tube converts, as was explained above, each light image point into an electrical signal. The successive electrical signals are conducted by flexible coaxial cables 81 to the outside of the intrascope and of the examined part. These transmitted electrical signals are next fed into appropriate receivers, such as kinescopes, facsimile receivers or skiatrons, known also as a "dark trace tube" and are reconverted into a visible image for inspection or for photographic recording. In case a color image of the examined part is necessary, we may use two or three phototubes or photocells. The phototube 78*a* will serve to receive red image points; phototube 78*b* will serve to receive green image points, and phototube 78*c* will receive blue image points. A white light image point may be split into its component colors by the use of suitable optical system. Dichroic mirrors 80 are useful for this purpose. It should be understood, however, that there are many optical means that can be used instead of said dichroic mirrors. In some cases, it is preferable to use, instead of dichroic mirrors, the rotating color disc 56*a*. The importance of this construction lies in the fact that I may use now one photo-tube or one photo-cell instead of three phototubes, which will markedly reduce the size of the intrascope. In this modification, the speed of the flying spot produced by the kinescope 76 has to be increased so that the whole examined area may be illuminated during the time in which one of three color filters of the disc 56 is in front of the single phototube 78. The rotating color wheel 56 may be set in motion by a miniature motor, such as used in electrical wrist watches, and which may be disposed within the intrascope. In such a case, the color wheel may be mounted on the shaft of said motor. In some cases it is preferable to have the motor disposed outside of the examined part. In such event, the motor may be connected with the rotating disc 56** by means of flexible cables or the power may be transmitted from the motor to the disc by pneumatic means or hydraulic means. The pressure exerted by the motor on a column of air or fluid is propagated by said pneumatic or hydraulic means to the disc and will cause its rotation.

The reproduction of color images may be improved by having in front of each phototube or photocell **78*a*, 78*b* and 78*c*, suitable filters 79*a*, 79*b* and 79*c***, which transmit only red, green and blue light respectively.

It should be understood that all types of phototubes or photocells may be used for purposes of my invention. In particular I may use phototubes of photoemissive type, of photo-conductive type or photo-voltaic type. The photocells having silicon, germanium or bismuth in combination with antimony or aluminum with antimony are most suitable because such photocells show high frequency response, which is necessary for the operation of my device. Also modified photo-transistors, which have a large photo-sensitive surface in contradistinction to the conventional ones, in which the photo-sensitive area is very small, may be used in my invention.

It may be added that when dealing with short distances, which do not cause a prohibitive loss of light, the light conductor 77 may extend to the outside of the examined part and the image then may be examined directly without the need of conversion of light image points into electrical signals, as was explained above and illustrated in Fig. 3. In such cases the image points, which appear successively at the end face 77*b* of the light conductor 77, may be projected by an optical lens and may be seen by the examiner directly because, due to the persistence of vision, the successive image points conducted by the conductor 77 will reproduce a total image in the retina of the examiner.

In some cases the light conductor 77 does not have to extend to the outside of the examined part, but it may be used in combination with an optical system, which will deliver the light image from the end-face 77*b* of the conductor to the outside of the examined part. This arrangement is feasible only in locations in which the course of the examined passages between the end-face 77*b* of the conductor and the outside is well known in advance, so that a suitable optical system can be provided.

In some applications where the distance between the examined part and the outside is small, also the image conductor which consists of plurality of fibers conducting light may be used without a television system. This embodiment of my invention is shown in Fig. 4. The light image produced by the light source 79 is conducted by the image conductor 70 to the outside where it can be examined visually, recorded or photographed. In some cases the light conductor 70 does not have to extend to the outside of the examined part because the course of the examined part becomes straight. In this event it is preferable to combine the light image conductor with an additional optical system which will project the image from the intrascope to the outside of the examined part.

Another embodiment of my invention is shown in Fig. 5 in which the light source is disposed outside of the examined part and is projected onto the end-face of the image conductor 70 by the half-reflecting and half-transparent mirror 58, as was explained above.

The light image of the examined part which is transmitted by the image conductor 70 to the outside in some cases may be too weak for visual inspection and may require dark adaptation of the eyes. In such cases the image will be also too weak for photographing. For such examinations I made a modification of my invention which is shown in Fig. 6. In this embodiment of my invention the image conductor 70 is inserted into vacuum tube 60 through its wall 60*a*. The photocathode 61 of the vacuum tube which may be of photoemissive type or photoconductive type is deposited on the end-face 51*b* of the image conductor. The light emerging from the end-face 51*b* can now excite the photocathode 61 as the optical system is eliminated, which as was explained is causing a prohibitive loss of light. The electrons emitted from the photocathode 61 are imaged by magnetic or electrostatic lenses 64 and are focused on the fluorescent screen 62 disposed at the other end of the tube and protected by the light-reflecting layer 62*a* such as of aluminum. The electron image may be also intensified by accelerating fields 64. Furthermore it may be intensified by electron-optical diminution which results in an increase in intensity proportional to the square power of linear demagnification.

This may be accomplished by means of electromagnet 63 or electrostatic lenses 64. The electrostatic lenses may be in the form of series of cylinders or rings of progressively smaller diameter. They are disposed inside of the tube and are connected to an outside source of potential. The magnetic or electromagnetic lenses may be in the form of coils surrounding the tube from outside. Such coils may be tapered or may be in the form of a short coil extending from some point between the photocathode 61 and the fluorescent screen 62, up to said fluorescent screen 62. The intensified image which appears on the fluorescent screen can be inspected visually by the observer directly or may be first magnified by an optical eye-piece 64*a*. The optical magnification of the electron-optically diminished image does not result in its loss of brightness as long as said magnification does not exceed certain limits. In this way the the intensification of the image obtained by means of electron-optical diminution is not lost although the image is magnified again optically. Therefore the image of the examined part which was too weak for examination can now be presented with necessary brightness.

The use of the image tube 60 may also be necessary when using as an image forming radiation an invisible radiation such as ultra-violet or infra-red. In cases of which the preservation of light is not critical it may be possible to project the image emerging from end-face 51*b* of the image conductor 70 on the photocathode 61 of the image tube by optical means. In cases in which the definition reproduced image is not important, the end-face 51*b* of the image conductor 71 may be attached to the end-face of the image tube to be in tight apposition to the external surface of the image tube 60. The thickness of the wall of the image tube 60 which separates the end-face 51*b* of the image conductor from the photocathode 61 which will cause however a marked blurring of the image. The image tube may be also advantageously used within the intrascope in order to intensify the weak image emerging from the end-face of the image conductor before it is being projected on the television pick-up tube. In this embodiment the image tube has to be of miniature size. This can be accomplished by eliminating focusing electrodes and bringing the photocathode 61 very close to the fluorescent image reproducing screen 62 to prevent blurring of electron image.

In some cases it is preferably to use as the light 7*a* or 65 for illumination of the examined part a polarized light. The image conducted by the image conductor to the observer is not polarized any more due to multiple reflections. Therefore by providing means which will stop the polarized light from reaching the observer but will transmit the non-polarized light, the contrast of the examined part will be markedly improved. This construction is of critical importance, in devices in which the light for illumination of the examined part has to be delivered to the examined part by the same image conductor which serves to return the image to the observer. There are many ways in the art to eliminate the polarized light. Fig. 5 shows one of the means suitable for the purpose of this invention. The rotating prism 59 serves to stop the polarized light from the source 65 and it will at the same time transmit the non-polarized light. The resulting improvement in contrast will make my device operative in many cases in which without this improvement it would not be feasible to examine the received image.

It should be clearly understood that all my intrascopes can serve and produce and transmit color images as well.

It is also to be understood that in some applications the encasing means for the image conductor or for pick-up tubes may be omitted.

My invention is not limited to visible light images. All my intrascopes may be made responsive to invisible images on either side of visible spectrum by using appropriate photo-sensitive layer in the photocathode of the television pick-up tube. It is to be understood that all my intrascopes may serve for receiving images formed not only by various electromagnetic radiations such as ultra-violet, infra-red, etc., but also by particles radiation such as neutrons, alpha-particles, protons, electrons or by ions. In such cases the photocathode of the pick-up tube described above may be provided with an atomic particles sensitive phosphor on the side facing said image, or may have a special electron or other atomic particles emissive photocathode.

The embodiment of my invention illustrated in Fig. 5 may be also modified by using instead of the image conductor 70, which consists of plural fibers 52, the conductor 77, which consists of one solid rod of material conducting light, as was explained above. In order to make this modification operative, I found that the source of light must be able to produce a scanning light illumination. Therefore, instead of the electrical bulb 65 I am using in this embodiment of my invention the flying spot of light produced by a vacuum tube 16*a* or 76, as was described above. The remaining parts of my device may be the same as shown in Fig. 5.

I also found that the novel image conductors 51, 70 or 77 may transmit not only white light but also infrared light and ultra-violet light. It is to be understood therefore that the term "light" as used in my disclosure embraces the visible light as well as the invisible.

Another important discovery was that supersonic waves can be also conducted by the conductors 51, 70 or 77. By using as a source of image forming radiation piezoelectric or magnetostrictive means, we may produce supersonic images of the examined part. Piezoelectric means may be in the form of oscillating crystals of quartz, titanate compounds, Rochelle salts and other similar materials.

As various possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. A device comprising in combination means adapted in size and shape for introducing said device within the examined body, means for producing illumination and means for producing an image of the examined part, image conducing means operating by internal reflection of light and a vacuum tube provided with photoelectric means and with means for producing electrical signals representative of said image.

2. A device comprising in combination means adapted in size and shape for introducing said device within the examined body, means for producing illumination and means for producing an image of the examined part, image conducting means comprising a plurality of fibers operating by internal reflection of light, and having the length not exceeding 15 centimeters, and a vacuum tube receiving said image and provided with photoelectric means and with means for converting said received image into electrical signals representative of said image.

3. A device as defined in claim 2, in which said vacuum tube with photoelectric means comprises means for producing a scanning electron beam.

4. A device comprising in combination means adapted in size and shape for introducing said device within the examined body, means for producing illumination and means for producing an image of the examined part, said means for producing said illumination comprising a vacuum tube provided with a fluorescent screen and with a scanning electron beam producing scanning illumination of said examined part and forming thereby successive image points of said part, light conducting means operating by the internal reflection of light and transporting said successive image points, and a vacuum tube having photoelectric means for receiving said successive image points and converting said image points into electrical signals representative of said image points.

5. A device as defined in claim 4, which comprises in addition means for producing color point images of said examined body.

References Cited in the file of this patent

UNITED STATES PATENTS

| | | |
|---|---|---|
| 731,496 | Poirier et al. | June 23, 1903 |
| 944,830 | Sussmann | Dec. 28, 1909 |
| 1,751,584 | Hansell | Mar. 25, 1930 |
| 1,848,814 | Allen | Mar. 8, 1932 |
| 2,341,745 | Silverman et al. | Feb. 15, 1944 |
| 2,354,591 | Goldsmith | July 25, 1944 |
| 2,433,971 | Adams | Jan. 6, 1948 |
| 2,541,976 | Bogart | Feb. 20, 1951 |
| 2,555,424 | Sheldon | June 5, 1951 |
| 2,632,801 | Donaldson | Mar. 24, 1953 |
| 2,649,500 | Fedorchak | Aug. 18, 1953 |
| 2,755,390 | Teichmann | July 17, 1956 |

FOREIGN PATENTS

| | | |
|---|---|---|
| 604,198 | Great Britain | June 30, 1948 |